United States Patent
Dally et al.

(10) Patent No.: US 8,698,097 B2
(45) Date of Patent: Apr. 15, 2014

(54) RADIALLY INWARDLY DIRECTED ELECTRON BEAM SOURCE AND WINDOW ASSEMBLY FOR ELECTRON BEAM SOURCE OR OTHER SOURCE OF ELECTROMAGNETIC RADIATION

(76) Inventors: Edgar B. Dally, Carmel, CA (US); Robert J. Espinosa, Campbell, CA (US)

( * ) Notice: Subject to any disclaimer, the term of this patent is extended or adjusted under 35 U.S.C. 154(b) by 553 days.

(21) Appl. No.: 12/460,418

(22) Filed: Jul. 17, 2009

(65) Prior Publication Data
US 2010/0065752 A1    Mar. 18, 2010

Related U.S. Application Data

(60) Provisional application No. 61/135,138, filed on Jul. 17, 2008.

(51) Int. Cl.
*A61L 2/08* (2006.01)
(52) U.S. Cl.
USPC .................. 250/436; 250/432 R; 250/455.11; 422/22; 422/23

(58) Field of Classification Search
USPC ........ 250/428, 432 R, 433, 436, 437, 453.11, 250/455.11, 505.1, 515.1; 422/22, 23
See application file for complete search history.

(56) References Cited

U.S. PATENT DOCUMENTS

| | | | | |
|---|---|---|---|---|
| 2003/0009075 A1* | 1/2003 | Zante | ............................ | 588/227 |
| 2005/0084072 A1* | 4/2005 | Pinchot | ......................... | 378/154 |
| 2005/0225224 A1* | 10/2005 | Dally et al. | ................ | 313/361.1 |

* cited by examiner

*Primary Examiner* — Nicole Ippolito
(74) *Attorney, Agent, or Firm* — William C. Milks, III

(57) ABSTRACT

A system and method to provide uniform, high intensity radially inwardly directed electron beams to the interior of a cylindrical volume for the purpose of destroying toxic, hazardous, or noxious organic and/or inorganic compounds contained in air or other media flowing through a cylindrical region; or to destroy or inactivate bacteria, viruses, fungi, or mold spores in such flowing media; to sterilize contents of flowing media; to treat fluidized grains, herbs, or other products; or to destroy chemical warfare agents. A window assembly to transmit electromagnetic radiation, for example, an electron beam, x-rays, or other high energy electromagnetic radiation, is also disclosed.

22 Claims, 14 Drawing Sheets

RADIALLY INWARDLY DIRECTED ELECTRON BEAM SOURCE AND WINDOW ASSEMBLY FOR ELECTRON BEAM SOURCE OR OTHER SOURCE OF ELECTROMAGNETIC RADIATION

CROSS-REFERENCE TO RELATED PATENT APPLICATION

This application relates to U.S. Provisional Patent Application No. 61/135,138 filed on Jul. 17, 2008, entitled RADIALLY INWARDLY DIRECTED ELECTRON BEAM SOURCE FOR TREATMENT OF FLOWING MEDIA, which is hereby incorporated herein in its entirety by this reference.

BACKGROUND OF THE INVENTION

1. Field of the Invention

The present invention relates generally to apparatus and processes for producing electromagnetic energy, and, more particularly, to systems and methods to transmit high energy electromagnetic radiation from a source to an external region, for example, to treat materials and, more particularly, to treat a flow of matter containing a harmful or noxious component. Specifically, one embodiment of the present invention provides a system and method to provide a uniform, high-intensity electron beam to the interior of a cylindrical volume for the purpose of destroying toxic, hazardous, or noxious organic and/or inorganic compounds contained in air or other media flowing through a cylindrical region, so as to destroy or inactivate bacteria, viruses, fungi, or mold spores in such flowing media; or to sterilize the contents of flowing media; or to treat fluidized grains, herbs, or other similar products to provide sterilization; or to destroy chemical warfare agents. Another embodiment of the present invention provides a system and method to provide a high-intensity electron beam or other electromagnetic radiation, for example, x-ray radiation, to the interior of a cylindrical utilization region or other external region.

2. Description of the Prior Art

Various devices are known for producing electromagnetic radiation. Known devices and processes include electron beam devices and other devices such as devices that produce x-rays. A beam of electrons or x-rays is controlled to radiate energy for any of a variety of purposes well-known to persons skilled in the art.

For example, various devices are known for destroying toxic, hazardous, or noxious organic and/or inorganic compounds contained in flowing air or other media. Known devices and processes include electron beam devices. A beam of electrons irradiates the flowing air or other media to destroy the toxic, hazardous, or noxious organic and/or inorganic compounds contained in the flowing media.

The configurations of known electron beam and other electromagnetic radiation devices may typically incorporate a structure to control the emitted radiation, but are not generally conducive to the effective and efficient transmission of the emitted radiation or the dissipation of heat that is generated. Moreover, known configurations are not scalable.

For example, the configurations of known electron beam devices are not generally conducive to the effective and efficient treatment of the flowing media. Moreover, known configurations are not scalable to treat large volumes of flowing media.

It would be desirable to provide a solution that overcomes the disadvantages of known electron beam and other electromagnetic radiation devices. More particularly, it would be desirable to provide an electron beam or other electromagnetic radiation system and method that effectively and efficiently transmit the emitted radiation and dissipate heat. It would also be desirable to provide such a system and method that are scaleable. It would also be desirable to provide a solution that overcomes the disadvantages of known electron beam devices for treating flowing media. More particularly, it would be desirable to provide an electron beam system and method that effectively and efficiently treat the flowing media. Additionally, it would also be desirable to provide such a system and method that are scaleable to treat various volumes, including large volumes, of flowing media.

SUMMARY OF THE INVENTION

In accordance with an aspect of the present invention, a system and method are provided for transmitting an electron beam, x-rays, or other form of high energy electromagnetic radiation from an evacuated space in which the radiation is generated to an external region, for example, to treat flowing media. In accordance with one embodiment, the system comprises an electron beam generator that preferably employs a thermionic cathode. Advantageously, cold electron emission cathodes do not require heating power. In accordance with one preferred embodiment, the electron beam generator comprises a cold electron emitting surface in sheet form, which can be shaped to different patterns of emission, and emits electrons from a large surface area. The cathode is disposed on the inside of a cylinder. Constructed with or without a control grid, and with an applied negative high voltage between the cathode and a grounded cylinder of smaller diameter, for example, a tube or window assembly, a beam of electrons is accelerated in a direction perpendicular to the common axis of the cylinders. The smaller cylinder is preferably provided with windows constructed of sufficiently thin material, so that the electrons pass through such windows into an inner cylindrical region within the smaller cylinder. The electrons irradiate flowing media passing through the inner cylindrical region. In accordance with a preferred embodiment, the flowing media passing through the inner cylindrical region is effectively and efficiently processed for the purpose of destroying toxic, hazardous, or noxious organic and/or inorganic compounds contained in air or other gaseous media flowing through the cylindrical region, so as to destroy or inactivate bacteria, viruses, fungi, or mold spores in such flowing media; or to sterilize the contents of the flowing media; or to treat fluidized grains, herbs, or other similar products to provide sterilization; or to destroy chemical warfare agents.

In accordance with another aspect of the present invention, a window component subassembly is provided comprising an outer cylinder that provides a means of mechanical support and heat conduction for an inner cylinder. The cylinders have a plurality of slits that comprise windows through which an electron beam, x-rays, or other form of high energy electromagnetic radiation is transmitted.

The outer cylinder may be comprised of a single material with the required mechanical strength, thermal conductance, and thermal expansion coefficient as required for the construction of the window subassembly, or a plurality of cylinders and segments that together provide the required characteristics if use of a single cylinder of material with the required characteristics is prohibited by practical and/or economic factors. The inner cylinder is preferably bonded to the outer cylinder to enable the transfer of heat to keep the window areas of the inner cylinder cool during operation. The material for the inner cylinder has properties such that the radiation passes through it with a minimum of absorption and reflection. The material must also have sufficient mechanical strength to withstand the differential pressure between the vacuum and application space and be available as a thin foil because the absorption and reflection of the radiation increases with the thickness and density of the material.

The thermal expansion coefficients of the inner and outer cylinders are approximately equal to minimize the mechanical stress and distortion of the cylinders during the bonding process construction of the window component subassembly.

An additional cylinder having an outside diameter smaller than the inside diameter of the inner foil window cylinder and bonded to it may be added to the window component subassembly to further reduce mechanical and thermal stress in the window foil and/or to reduce or prevent corrosion of the inner surface of the window foil by material being treated in the application space. In accordance with one embodiment, both the inner window foil cylinder and the additional cylinder are constructed from titanium.

In accordance with one example, the supporting or outer cylinder is comprised of a copper cylinder to provide the high thermal conductance and a 410S stainless steel cylinder that has an expansion coefficient nearly equal to the thermal expansion coefficient of the titanium foil window material.

In accordance with a preferred embodiment, a window component subassembly is provided wherein the additional cylinder preferably comprises an inner sleeve having a given outside diameter and preferably constructed from a titanium alloy. The inner sleeve has a plurality of slits which comprise windows for radiation. The window component subassembly further comprises an outer cylinder comprising an outer sleeve having a given inside diameter that is greater than the outside diameter of the inner sleeve and a given outside diameter. The outer sleeve is preferably constructed from a metal having a relatively high coefficient of thermal expansion, for example, OFE grade copper.

The window component subassembly also preferably comprises an outer support having a given inside diameter that is larger than the outside diameter of the outer sleeve. Preferably, the subassembly comprising the outer sleeve and outer support is then brazed together using a braze sheet, for example, a copper-gold-nickel material, disposed between the outer sleeve and the outer support. The brazed subassembly is then provided with a plurality of slits which comprise windows for radiation.

Preferably, a foil comprising the inner cylinder, for example, a titanium alloy foil, is placed around the circumference of the additional cylinder comprising the inner sleeve so as to overlie the slits in the inner sleeve. The foil-wrapped inner sleeve is slid into the outer sleeve so that the slits of the inner sleeve align with the slits of the outer sleeve and outer support.

Additionally, in accordance with a preferred embodiment, a window assembly incorporating the window component subassembly is provided. The window subassembly additionally comprises a first end support subassembly and a second end support subassembly preferably each constructed from a metal having a relatively high coefficient of thermal expansion, for example, OFE grade copper. The first and second end support subassemblies each comprise a flange having an outside diameter that is less than the inside diameter of the inner sleeve of the window component subassembly. The flanges are slid into the opposite ends of the inner sleeve. A tubular mandrill having a higher coefficient of thermal expansion is then inserted through the interior of the first and second end support assemblies and the inner sleeve. The window assembly is then heated to form a diffusion bond between the first and second end support subassemblies and window component subassembly.

The foregoing and other objects, features, and advantages of the present invention will become more readily apparent from the following detailed description of various embodiments, which proceeds with reference to the accompanying drawing.

BRIEF DESCRIPTION OF THE DRAWING

The various embodiments of the present invention will be described in conjunction with the accompanying figures of the drawing to facilitate an understanding of the present invention. In the figures, like reference numerals refer to like elements. In the drawing:

FIG. 3, comprising

DETAILED DESCRIPTION OF THE PREFERRED EMBODIMENTS

Generally, in accordance with an aspect of the present invention, an electron beam system in accordance with various embodiments preferably employs cold electron emission technology to produce sheets of emitters deployed in a cylindrical geometry. The cathode is held in a vacuum by a grounded, sealed cylindrical housing and insulated from ground potential. The cylindrical housing is vacuum sealed, and can be equipped with an ion pump. A high voltage power supply accelerates emitted electrons in a radially inward direction towards the centerline of the cylindrical geometry. The electrons pass in vacuum through windows constructed of thin foil material (e.g., titanium or a titanium compound) preferably comprising a window assembly and emerge into a cylindrical region, for example, an application space where irradiation of matter or compounds contained in an air stream or other media flowing through the cylindrical region occurs. The cold electron emitting surfaces can be masked to provide electron emission from a series of sectors that are matched in shape and alignment with the windows though which the electrons are accelerated. Alternatively, the system can include a control grid with openings that are of matching size and shape and aligned with the windows through which the electrons pass into the cylindrical region.

Figure 1:
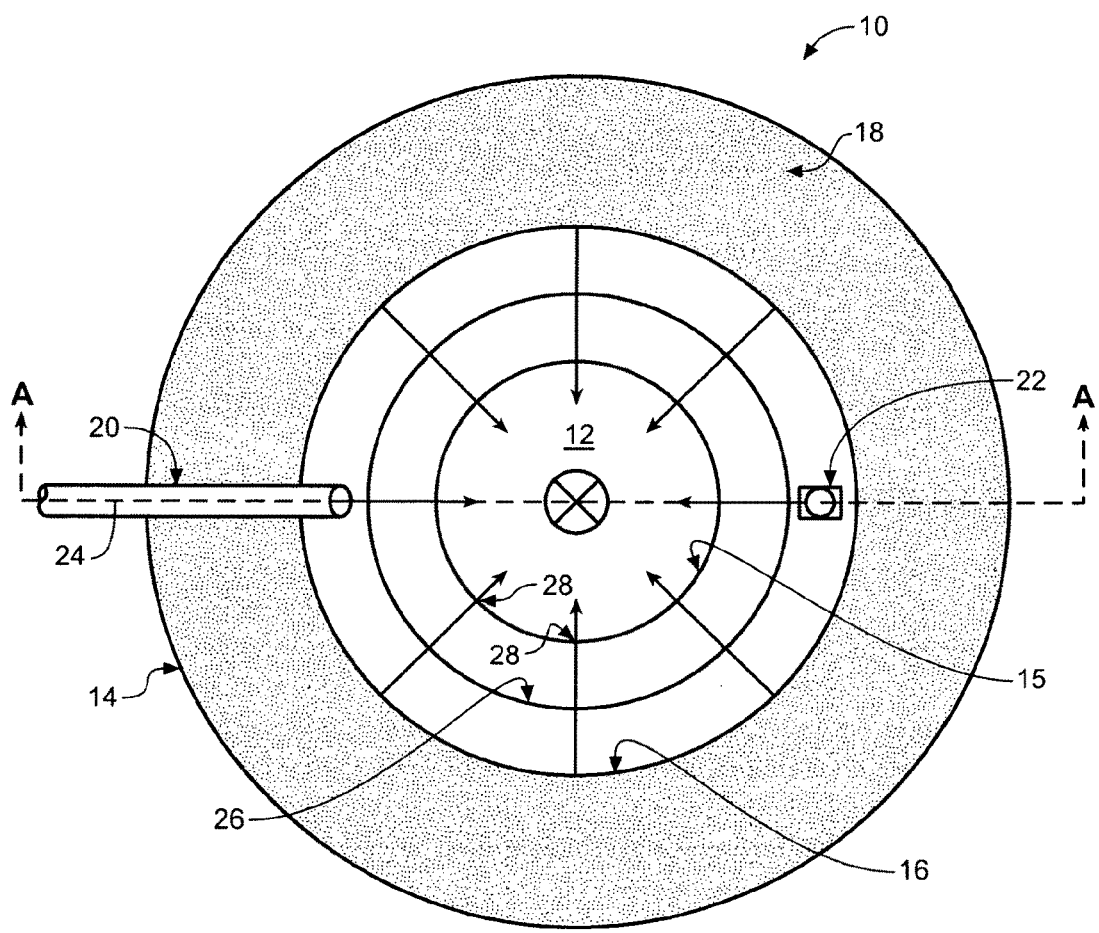
FIG. 1 is a schematic cross-sectional view illustrating one embodiment of the system in accordance with an aspect of the present invention.

Referring to the drawing figures, FIG. 1 shows a cross-sectional view illustrating one embodiment of a system 10 in accordance with one aspect of the present invention. The system 10 comprises an electron beam generator preferably employing a cold electron emission source to produce discrete emitters of specific shape and size to inject energetic electrons radially inwardly into an inner cylindrical region 12 to irradiate flowing media passing through the inner cylindrical region.

Figure 2:
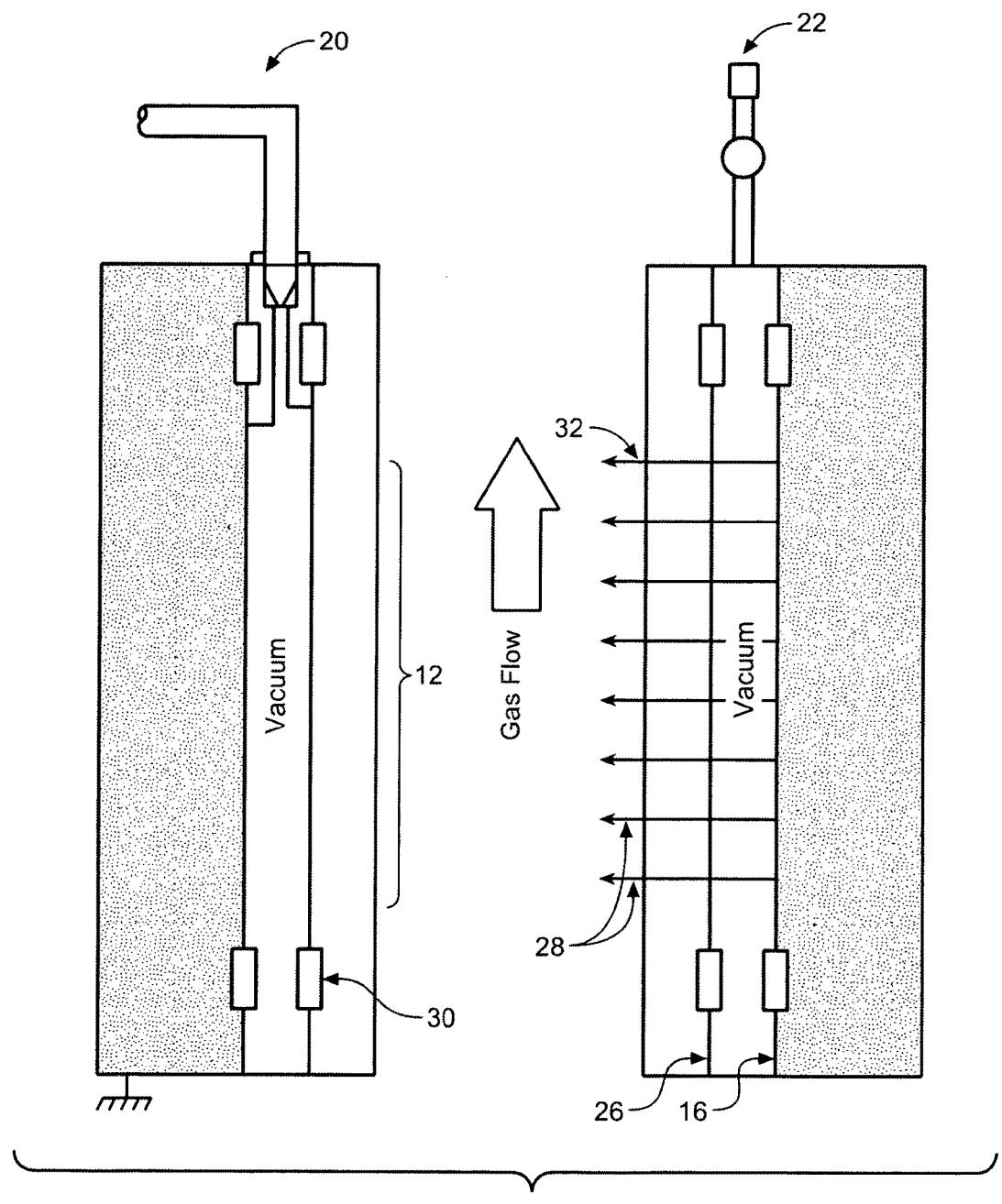
FIG. 2 is a cross-sectional view along line A-A of FIG. 1.

As shown in FIG. 1, the system 10 comprises a first cylinder 14 and a coaxial second cylinder 15, both of which are electrically grounded. An emitting cathode 16 is disposed in a vacuum and may be mounted to a grounded sheath 18 within the first cylinder 14. The sheath 18 may be an insulative material such as epoxy, oil, or gas. The first cylinder 14 is attached to the outer surface of a duct 20 and surrounds the duct and other elements of the system. The cathode 16 is preferably a cold cathode emission device. The system 10 is vacuum-sealed, and is preferably equipped with an ion pump 22. A high voltage power supply 24 is connected through the duct 20 to the cathode 16 and may also be connected to a control electrode or grid 26 to accelerate the emitted electrons in a radially inward direction toward the centerline of the cylindrical geometry. As shown in FIG. 2, insulators 30 are incorporated to provide mechanical support for the cathode 16 and the control grid 26. Alternatively, the control electrode or grid 26 may be omitted.

Referring to FIGS. 1 and 2, the electrons pass from the vacuum through windows 28 constructed of thin material (e.g., titanium or a titanium compound) and emerge into the central cylindrical region 12 where irradiation occurs to the materials or compounds contained in an air stream or other media that flows in the axial direction of the cylinder. In the embodiment that comprises the control grid 26, the windows 28 are aligned with slots in the control grid. In the alternative embodiment in which the control grid 26 is omitted, the windows 28 are aligned with masked emission areas of the cold cathode 16.

The cold cathode emitter 16 is preferably packaged as a unit that contains the emitter, electron beam optical focusing elements that direct the electron beam onto the individual exit windows 28 that separate the vacuum from the cylindrical region 12, and the control grid 26 with variable bias voltage that controls the magnitude of the beam injected into the cylindrical region.

Figure 3B:
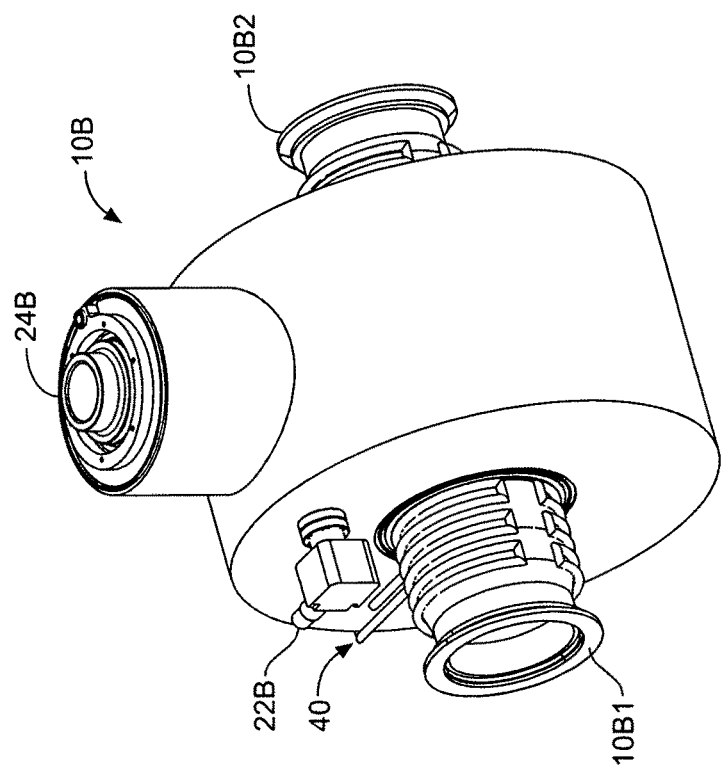
FIGS. 3A and 3B, is an isometric view of a preferred embodiment of the system in accordance with the present invention.
Figure 3A:
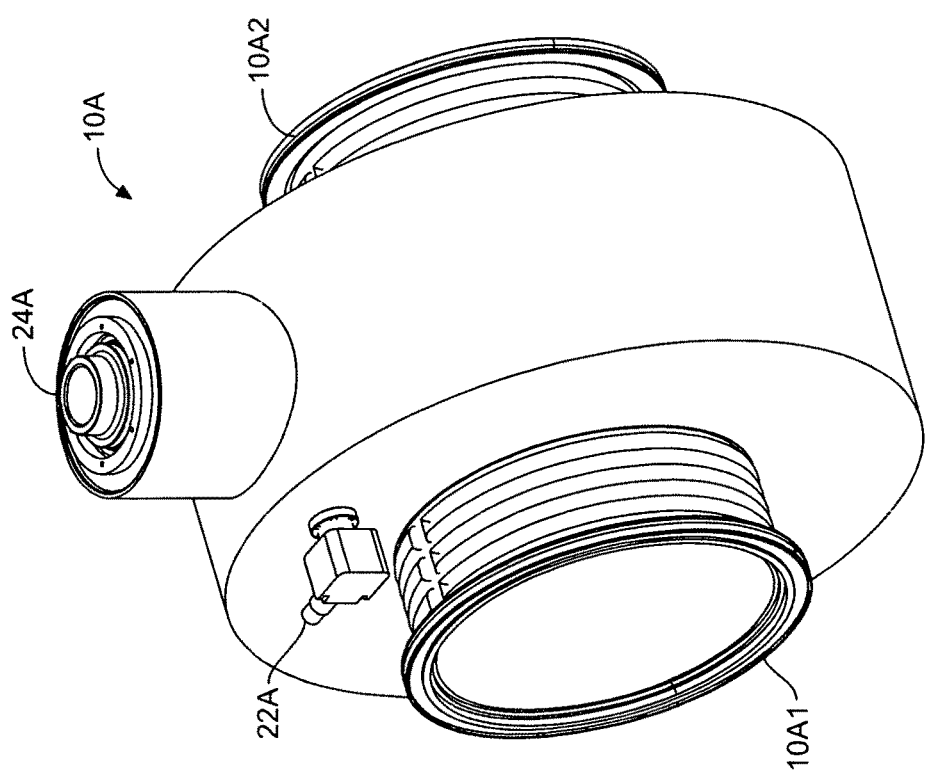

A preferred embodiment of the system 10 is shown in FIG. 3. For example, FIG. 3A shows a system 10A that is adapted to be incorporated into a standard 10-inch duct. Flanges 10A1 and 10A2 are sized for interconnecting the system 10A in line with a 10-inch duct. FIG. 3B shows an exemplary system 10B that is adapted to be incorporated into a standard 4-inch duct. Flanges 10B1 and 10B2 are sized for interconnecting the system 10B in line with a 4-inch duct. Thus, the system 10 in accordance with the various embodiments is scalable to accommodate use in various fluid flow systems.

As shown in FIGS. 3A and 3B, a nipple 22A or 22B is provided to connect to the ion pump 22 to draw a vacuum. Additionally, a high voltage connector 24A or 22B is provided to connect the control grid 26 and/or the cathode 16 to the high voltage power supply 24. Additionally, a water cooling supply line and return line 40 may be provided, as shown in FIG. 3B.

Figure 4:
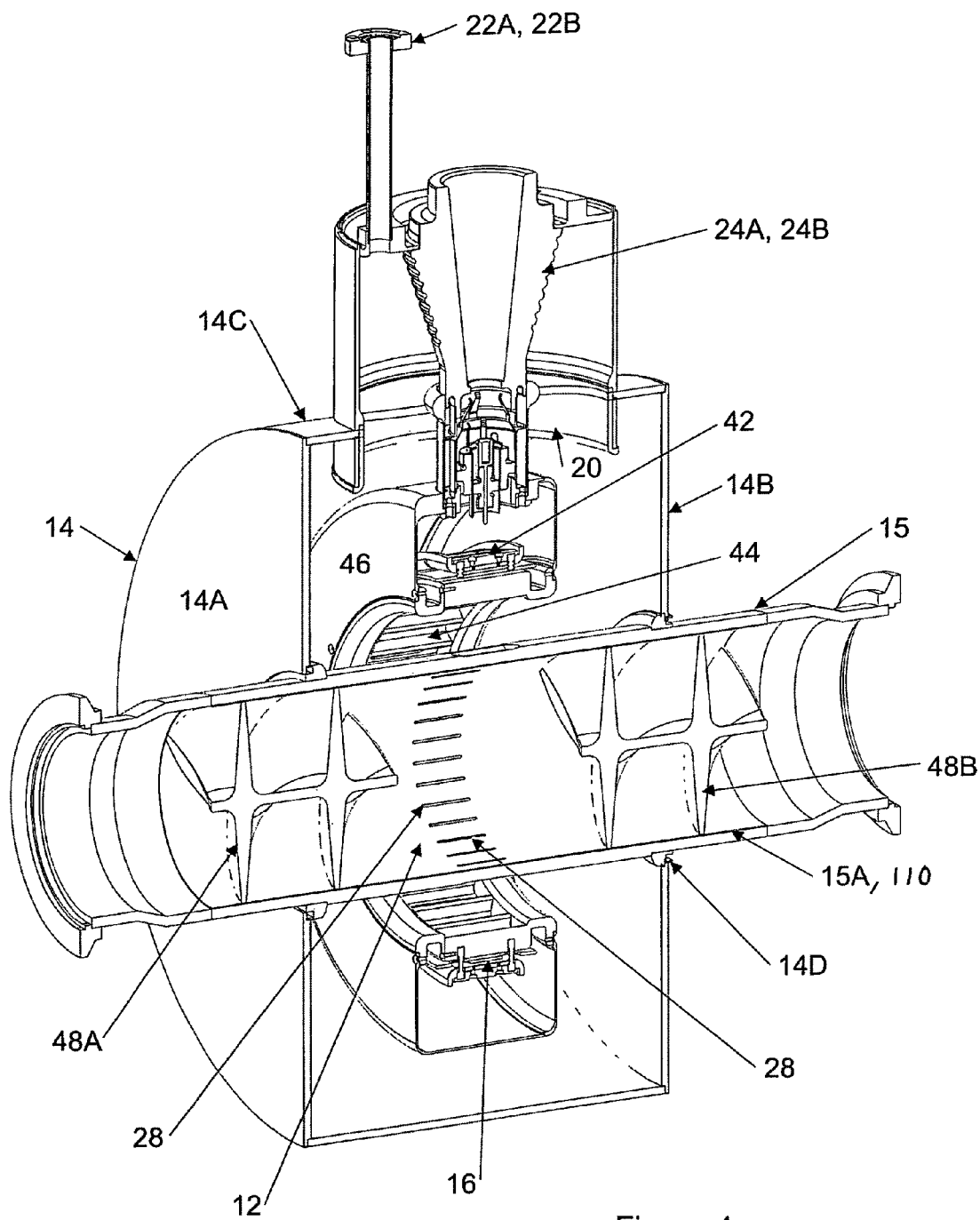
FIG. 4 is a detailed isometric cross-sectional view of the system shown in FIG. 3.
Figure 5:
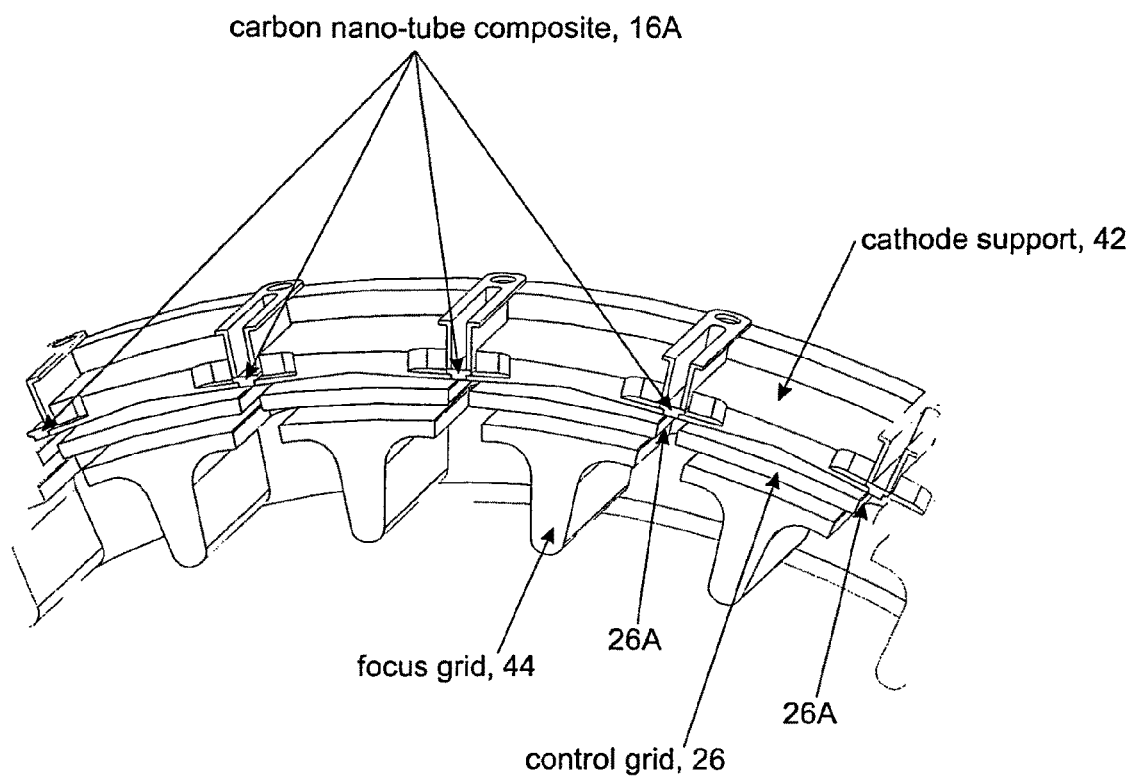
FIG. 5 is a detailed isometric view of one preferred cathode and control grid structure.

FIG. 4 is a detailed isometric cross-sectional view of the scalable system 10 shown in FIG. 3. The first cylinder 14 is defined by a cylindrical housing comprising end walls 14A and 14B and a cylindrical outer wall 14C, that provides a shielded vacuum enclosure. The cylindrical housing 14A, 14B, 14C is at ground potential. The ion pump 22 is connected to the nipple 22A, 22B and the duct 20 to the interior of the cylindrical housing 14A, 14B, 14C to evacuate the interior of the cylindrical housing. The cathode 16 is preferably a segmented cold cathode constructed of carbon nanotube composite comprising carbon nanotubes vertically grown from a substrate. As shown in FIGS. 4 and 5, the segments 16A of the cathode 16 are spaced apart and mounted on a cylindrical cathode support 42. FIG. 5 also shows the control grid 26 which comprises slots 26A through which electrons emitted by the segments 16A of the cathode 16 are accelerated. The control grid 26 may in turn be mounted to the cathode support 42 by the insulators 30. Preferably, as shown in FIGS. 4 and 5, a focus grid 44 is provided to direct the electrons accelerated through the slots 26A in the control grid 26 toward the windows 28. In the alternative embodiment without a control grid, the focus grid 44 prevents scatter of electrons and forms an electron beam.

Figure 6:
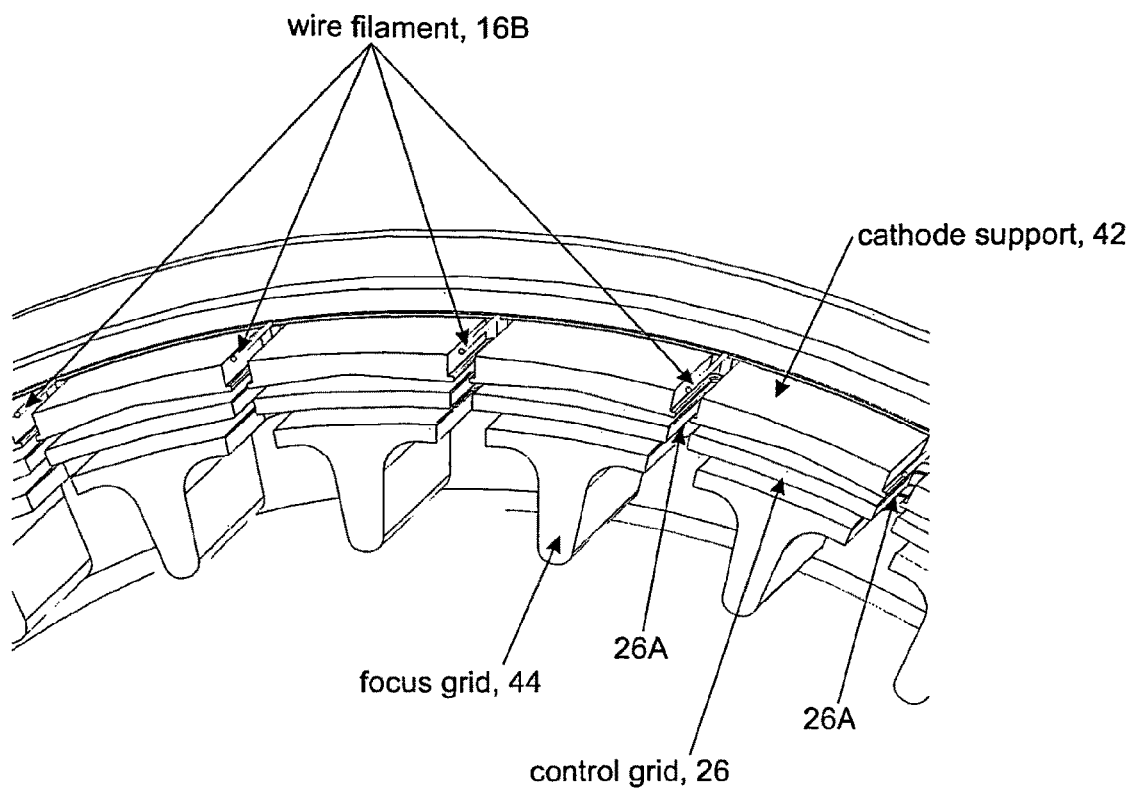
FIG. 6 is a detailed isometric view of an alternative cathode and control grid structure.

In accordance with an alternative embodiment, wire filament cathode elements are substituted for the segments of the carbon nanotube composite cathode shown in FIG. 5. FIG. 6 is a detailed isometric cross-sectional view of the scalable system 10 shown in FIG. 3 that illustrates the wire filaments 16B of the cathode 16 spaced apart and mounted on the cylindrical cathode support 42. FIG. 6 also shows the control grid 26 which comprises the slots 26A through which electrons emitted by the wire filaments 16B of the cathode 16 are accelerated. Preferably, the focus grid 44 is provided to focus the electrons accelerated through the slots 26A in the control grid 26. In the alternative embodiment without a control grid, the focus grid 44 prevents scatter of electrons and forms an electron beam.

Referring again to FIGS. 4, 5, and 6, the cathode 16, control grid 26, insulators 30, and focus grid 44 are preferably mounted within a shielding enclosure 46 that provides a shield for sharp edges within the enclosure. The enclosure 46 is in turn mounted to the high voltage connector 24A, 24B within the duct 20. The high voltage connector 24A, 24B is preferably a commercially available cone-shaped air-excluding type connector having a two-conductor to center ring connection configuration. One of the conductors is electrically connected to the cathode 16, and the other conductor may be connected to the control grid 26.

The high voltage power supply 24 is connected to the high voltage connector 24A, 24B. In accordance with one example, the high voltage power supply 24 supplies a relatively high negative voltage, for example, minus 160 kV to the cathode 16 and a relatively lower negative voltage, for example, minus 150 kV, to the control grid 26. As is well understood by persons skilled in the art, the voltage applied to the control grid 26 by the high voltage power supply 24 can be varied to provide constant current operation.

As also shown in FIG. 4, the coaxial second cylinder 15 comprises a tube 15A which is mounted within a through opening 14D in the end walls 14A and 14B of the cylindrical housing. The tube 15A is at ground potential. In accordance with one preferred embodiment, the tube 15A comprises a stainless steel liner bonded to a copper sheath. The stainless steel liner resists corrosion due to contact with the flowing media. The copper sheath provides good thermal conduction to dissipate heat. In one example, the composite tube 15A had a thickness of approximately 1 mm.

FIG. 4 also illustrates the windows 28 formed in the coaxial second cylinder 15. In accordance with one embodiment, the windows 28 are constructed by first providing slits in the tube 15A that are spaced apart and adapted to be aligned with the segments 16A (FIG. 5) or filaments 16B (FIG. 6) of the cathode 16. Then, a titanium/aluminum foil is applied to the exterior of the tube 15A overlying the slits and bonded to the tube by any of several methods known to persons skilled in the art. For example, the titanium/aluminum foil may be applied to the exterior of the tube 15A overlying the slits and diffusion bonded to the tube.

Figure 9:
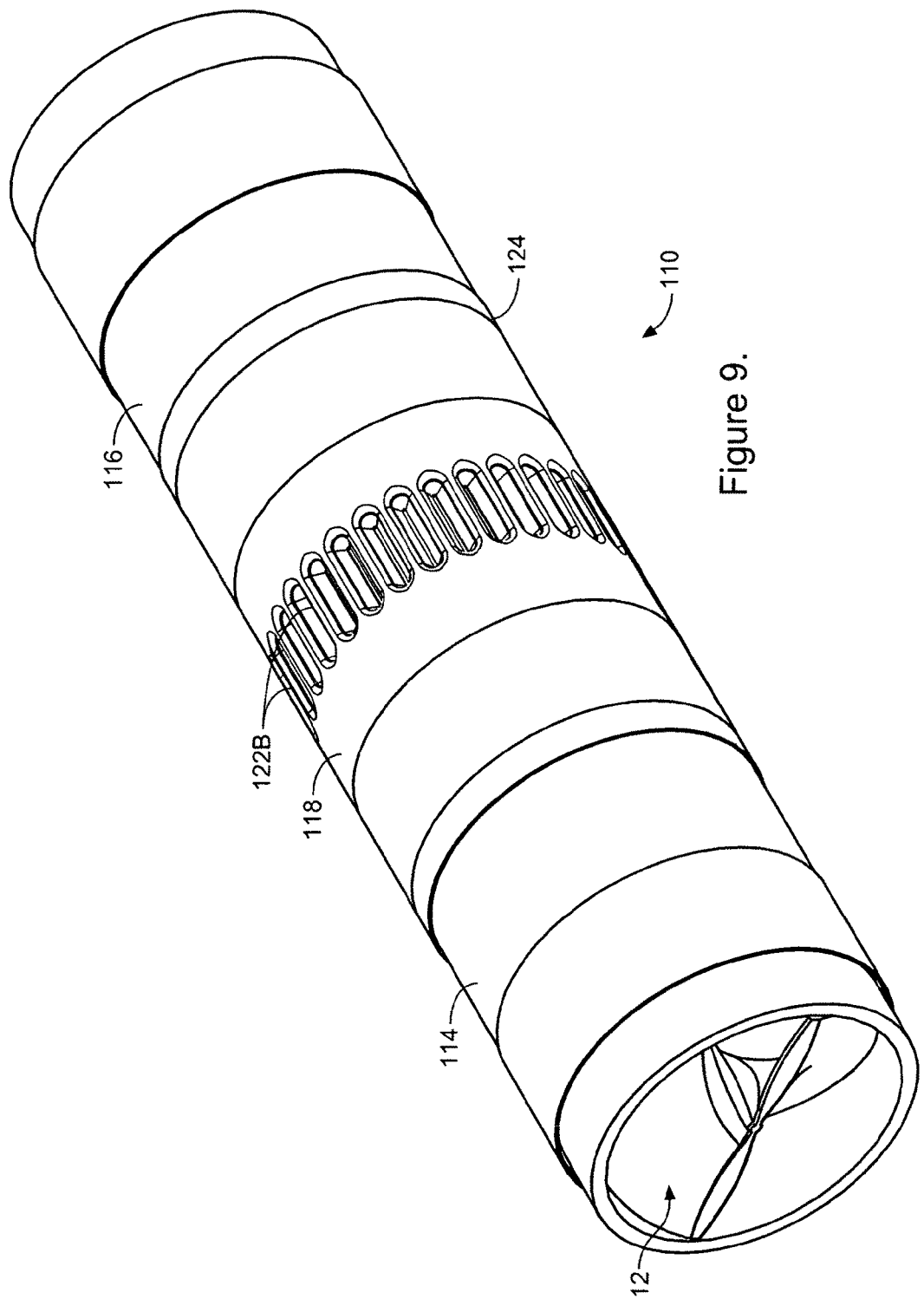
FIG. 9 is an isometric view illustrating a preferred embodiment of the window assembly in accordance with another aspect of the present invention.

In accordance with another aspect of the present invention, a window assembly may be provided in conjunction with the electron beam system shown in FIGS. 1 and 4. Referring to FIG. 9, a window assembly 110 may advantageously be substituted for the tube 15A. The window assembly 110 has slits 122A (FIG. 15) comprising windows corresponding to the windows 28, so that the electrons pass into the cylindrical region 12.

Considered in more detail, FIG. 9 is an isometric view of the window assembly 110 in accordance with one embodiment adapted to transmit radiation, for example, an electron beam, from an external source (not shown) to the cylindrical region 12. The window assembly 110 preferably comprises a first end support subassembly 114 and a second end support subassembly 116. The window assembly 110 also comprises a window component subassembly 118 disposed intermediate the first and second end support subassemblies 114, 116.

Figure 10:
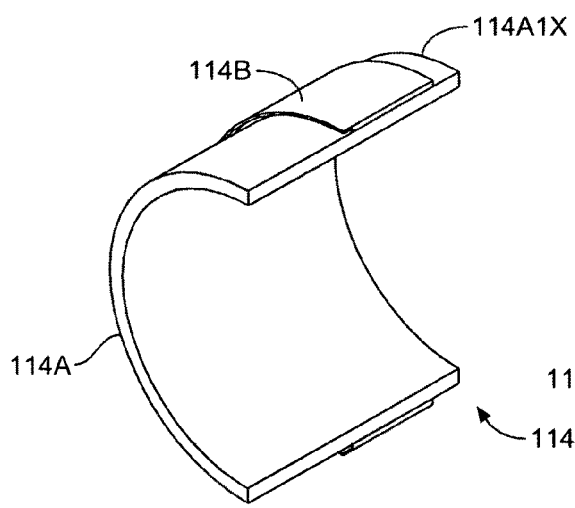
FIG. 10 shows an end support subassembly comprising the window assembly of FIG. 9.
Figure 11:
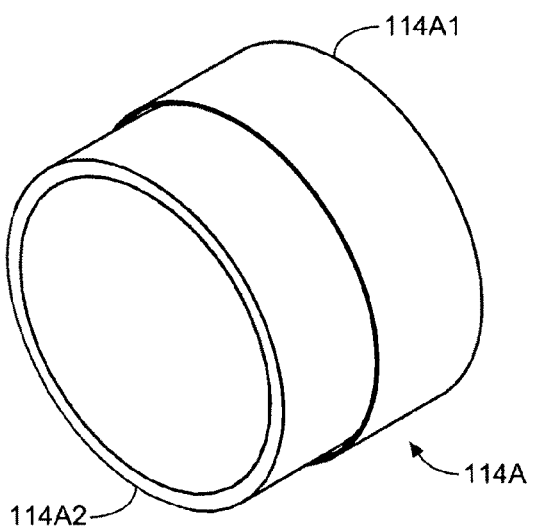
FIG. 11 is an isometric view of an end support comprising the end support subassembly of FIG. 10.

The first end support subassembly 114 and second end support subassembly 116 are preferably similarly manufactured, but the first end support subassembly has a left-to-right orientation, while the second end support subassembly has a right-to-left orientation such that the first and second end support subassemblies shown in FIG. 9 are mirror images of one another. Referring to FIG. 10, the first end support subassembly 114 comprises an end support 114A shown in more detail in FIG. 11. The end support 114A is preferably constructed from a metal having a relatively high coefficient of thermal expansion, for example, oxygen free electronic (OFE) grade copper having a coefficient of thermal expansion of $17.6 \times 10^{-6}$ cm/cm °C. ($9.8 \times 10^{-6}$ in/in °F.). The end support 114A has a first portion 114A1 having a given outside diameter and is preferably machined to provide a second portion 114A2 having a reduced outside diameter.

Figure 12:
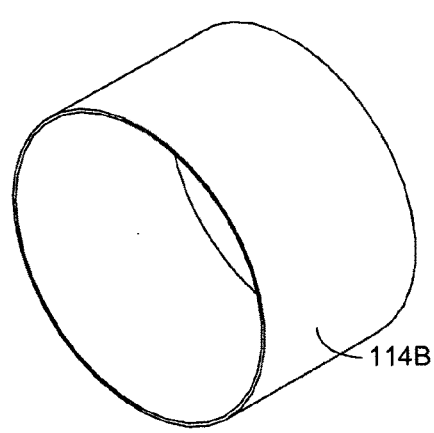
FIG. 12 is an isometric view of an end sleeve comprising the end support subassembly of FIG. 10.

The first end support subassembly 114 also comprises an end sleeve 114B, as shown in FIG. 10. As shown in more detail in FIG. 12, the end sleeve 114B has a given inside diameter and is preferably constructed from a metal having a lower coefficient of thermal expansion than the end support 114A. In the example in which the end support 114A is constructed from OFE grade copper, the end sleeve 114B may be constructed from 410S stainless steel, for example, having a coefficient of thermal expansion of $10.5 \times 10^{-6}$ cm/cm °C. ($5.9 \times 10^{-6}$ in/in °F.).

Figure 13:
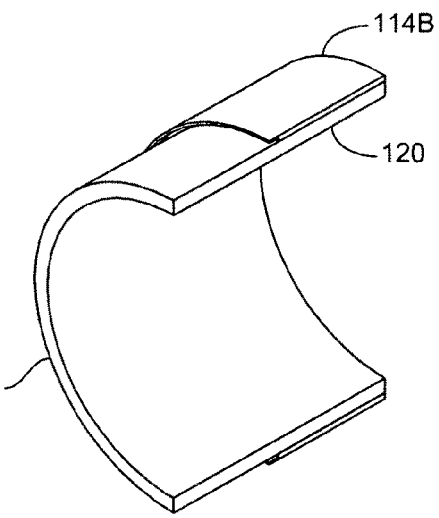
FIG. 13 is an isometric cross-sectional view illustrating manufacture of the end support subassembly of FIG. 10.
Figure 14:
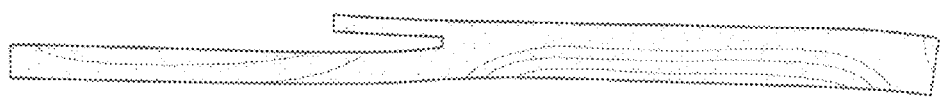
FIG. 14 shows brazing induced strain produced as a result of manufacture of the end support subassembly of FIG. 10.

The end support subassembly 114 is preferably manufactured as follows. The inside diameter of the end sleeve 114B is larger than the outside diameter of the first portion 114A1 of the end support 114A. A braze sheet 120, for example, a copper-gold-nickel material, can be placed around the circumference of the first portion 114A1 of the end support 114A, and the end sleeve 114B can be slid onto the end support 114A with the braze sheet disposed between the first portion 114A1 of the end support 114A and the end sleeve 114B, as shown in FIG. 13. The subassembly 114A, 114B and braze sheet 120 is then brazed at 780 degrees Centigrade, which produces the brazing induced strain shown in FIG. 14. The brazed subassembly is then preferably machined to remove any deformation (shown in FIG. 14) resulting from brazing, and the end sleeve 114B is machined to remove a portion of the end sleeve to expose a flange portion 114A1X of the first portion 114A1 to produce the finished end support subassembly 114 shown in FIG. 10.

The second end support subassembly 116 preferably consists of similar components as the first end support subassembly 114 and is manufactured in a similar manner as the first end support subassembly, although the orientation is reversed to that of the first end support subassembly, as shown in FIG. 9. Accordingly, persons skilled in the art will readily understand the structure of the second end support subassembly 116 in view of the preceding description.

Figure 15:
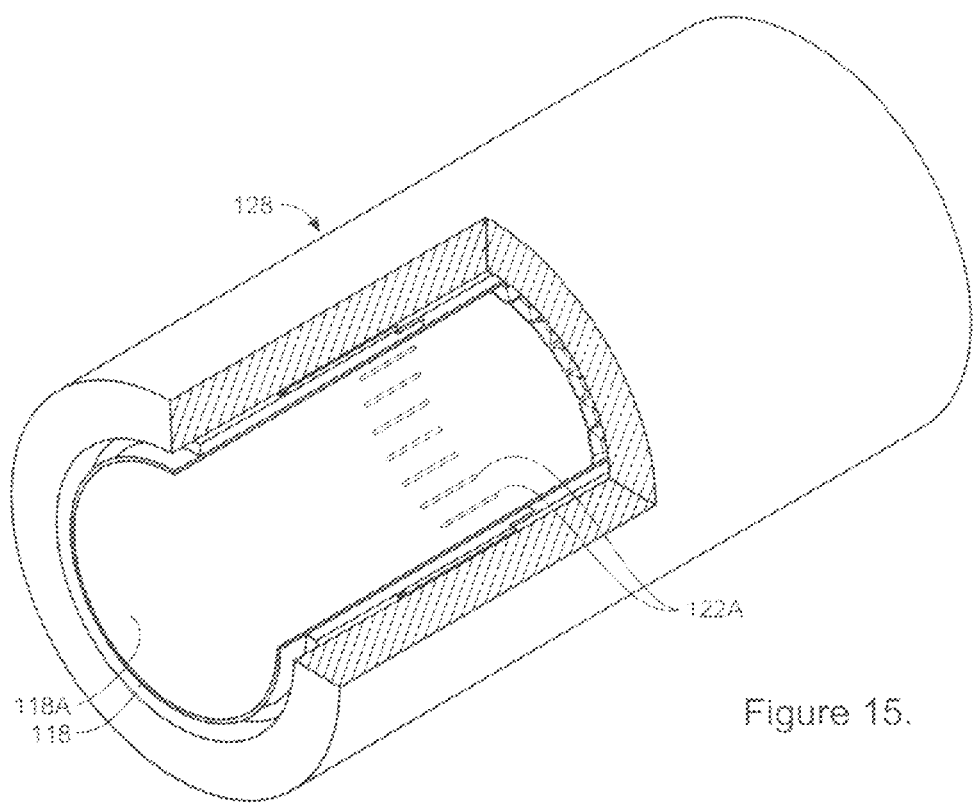
FIG. 15 shows an isometric view partially in cross-section of a window component subassembly comprising the window assembly of FIG. 9 positioned within a tool used for manufacture of the window component subassembly.

Referring now to FIG. 15, a window component subassembly 118 preferably comprises an additional cylinder comprising an inner sleeve 118A. The inner sleeve 118A has a given outside diameter and is preferably constructed from a titanium alloy, for example, having a coefficient of thermal expansion of 9.0 to $13 \times 10^{-6}$ cm/cm °C. (4.9 to $7.1 \times 10^{-6}$ in/in °F.). The inner sleeve 118A is machined to provide a plurality of slits 122A which comprise windows for radiation.

Figure 16:
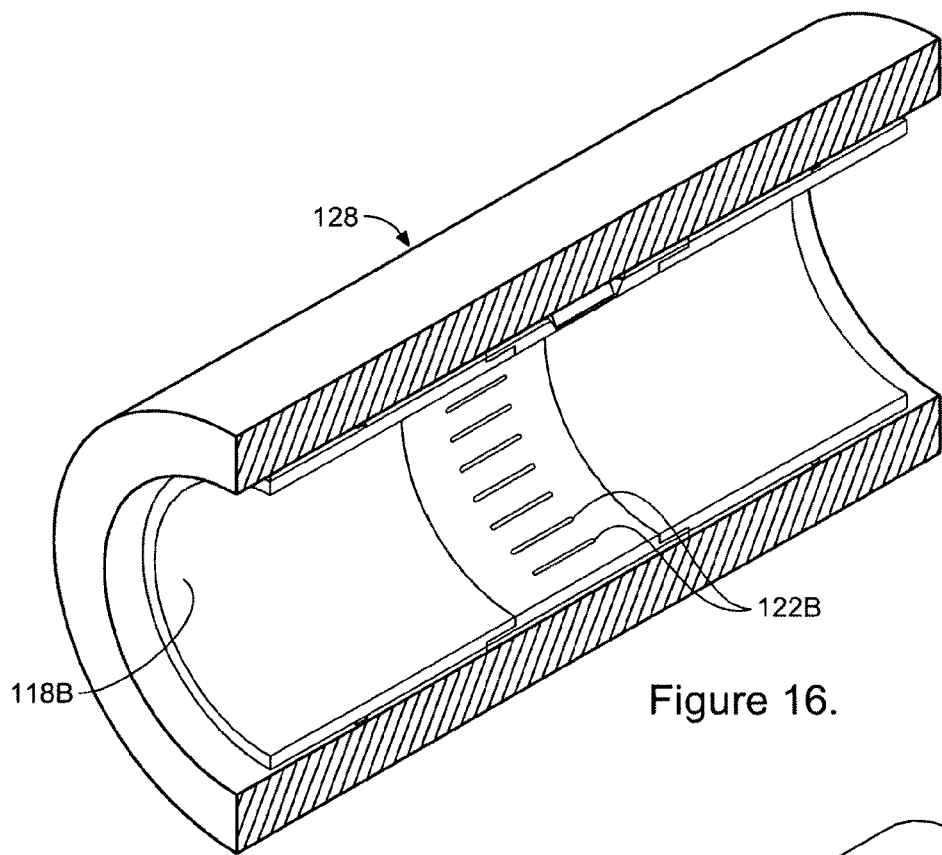
FIG. 16 is an isometric cross-sectional view of an outer cylinder comprising an outer sleeve comprising the window component subassembly shown in FIG. 15.

As shown in FIG. 16, the window component subassembly 118 further comprises an outer cylinder comprising an outer sleeve 118B having a given inside diameter that is greater than the outside diameter of the inner sleeve 118A and a given outside diameter. The outer sleeve 118B is preferably constructed from a metal having a relatively high coefficient of thermal expansion, for example, OFE grade copper having a coefficient of thermal expansion of $17.6 \times 10^{-6}$ cm/cm °C. ($9.8 \times 10^{-6}$ in/in °F.).

Figure 18:
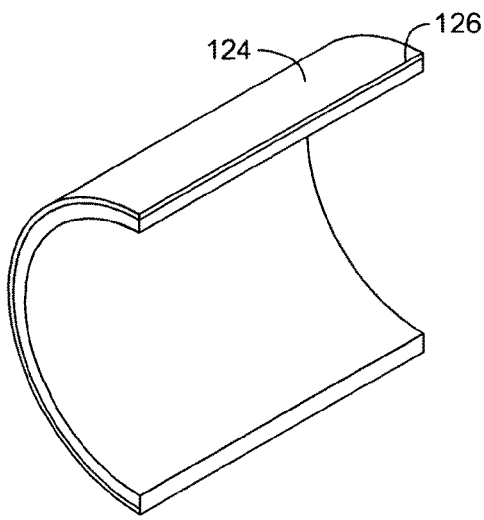
FIG. 18 is an isometric cross-sectional view illustrating manufacture of the outer sleeve and outer support of the window component subassembly of FIG. 15.
Figure 19:
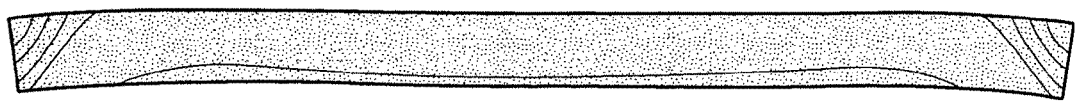
FIG. 19 shows brazing induced strain produced as a result of manufacture of the outer sleeve and outer support of the window component subassembly of FIG. 15.

The window component subassembly 118 also preferably comprises an outer support 124 having a given inside diameter, as shown in FIG. 18. The inside diameter of the outer support 124 is larger than the outside diameter of the outer sleeve 118B. A braze sheet 126, for example, a copper-gold-nickel material, can be placed around the circumference of the outer sleeve 118B, and the outer support 124 can be slid onto the outer sleeve 118B with the braze sheet disposed between the outer sleeve 118B and the outer support 124, as shown in FIG. 18. The subassembly 118B, 124 and braze sheet 126 is then brazed at 780 degrees Centigrade, which produces the brazing induced strain shown in FIG. 19. The brazed subassembly is then preferably machined to remove any deformation (shown in FIG. 19) resulting from brazing. The brazed subassembly comprising the outer sleeve 118B and outer support 124 is then machined to provide a plurality of slits 122B which comprise windows for electromagnetic radiation.

Figure 17:
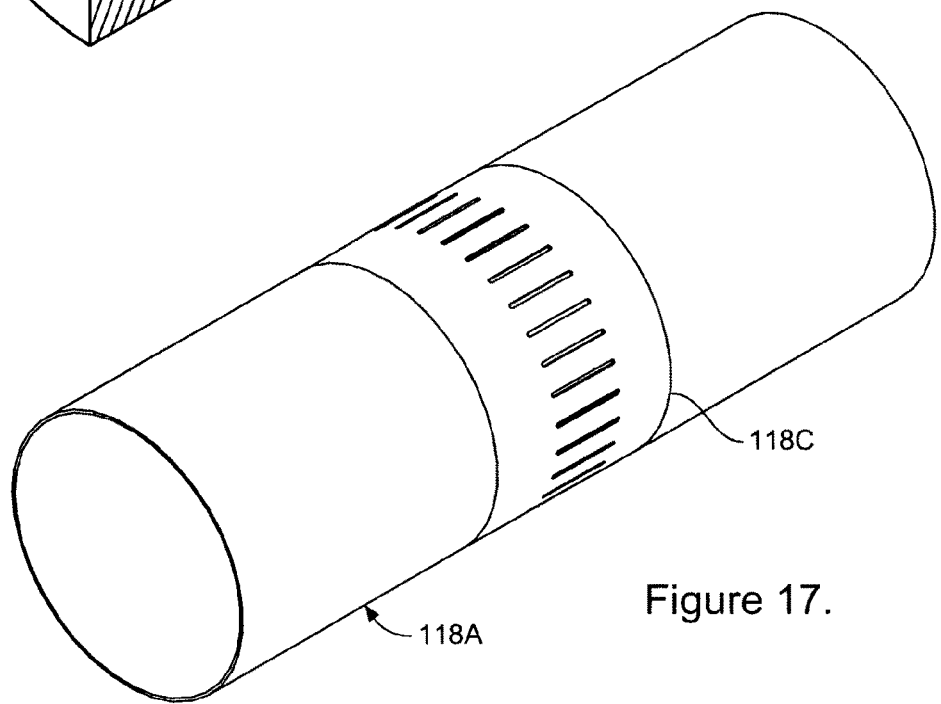
FIG. 17 is an isometric view of an inner cylinder comprising foil preferably placed around the circumference of a portion of an additional cylinder comprising an inner sleeve comprising the window component subassembly shown in FIG. 15.

As shown in FIG. 17, an inner cylinder comprises foil 118C, for example, titanium alloy foil. The inner foil cylinder 118C is preferably placed around the circumference of the inner sleeve 118A so as to overlie the slits 122A. The titanium alloy foil 118C has a thickness of 1.0 mil. or less, for example.

The window component subassembly 118 is preferably manufactured as follows. As shown in FIG. 15, the titanium-alloy-film-wrapped inner sleeve 118A, 118C is slid into the outer sleeve 118B so that the slits 122A of the inner sleeve align with the slits 122B of the outer sleeve and outer support 124. The resulting subassembly 118A, 124, 118B, 118C is slid into a tool 128.

The manufacture of the window subassembly 110 can be completed as follows. A material, for example, silver, is deposited onto the exterior of the inner sleeve 118A and the flange 114A1X of the first end support subassembly 114 and the corresponding flange of the second end support subassembly 116. The flange 114A1X of the first end support subassembly 114 and the corresponding flange of the second end support subassembly 116 have an outside diameter that is less than the inside diameter of the inner sleeve 118A, and are slid into the opposite ends of the inner sleeve disposed in the tool 128. A tubular mandrill (not shown) having a higher coefficient of thermal expansion than the tool 128 is then inserted through the interior of the first and second end support subassemblies 114, 116 and the inner sleeve 118A. The final window assembly 110 is then heated at approximately 450 degrees centigrade to form a diffusion bond between the first and second end support subassemblies 114, 116 and window component subassembly 118.

Referring again to FIG. 4, the window assembly 110 is mounted within the through opening 14D in the end walls 14A and 14B of the cylindrical housing 14. The window assembly 110 is at ground potential. In accordance with one preferred embodiment, the OFE copper sleeves comprising the window assembly 110 provide good thermal conduction to dissipate heat. In one example, the window assembly 110 had a thickness of approximately 1 mm. The slits 122A in the window assembly 110 comprising the windows corresponding to the windows 28 are adapted to be aligned with the segments of the cathode 16.

High energy radiation passes through the slits 122A, the foil 118C constructed of thin material (e.g., titanium or a titanium compound such as a titanium/aluminum alloy), and slits 122B comprising the windows corresponding to the windows 28 and emerges into the cylindrical region 12 where irradiation occurs, for example, to treat materials or compounds contained in an air stream or other media that flows in the axial direction of the cylinder.

As shown in FIG. 4, the interior of the tube 15A or window assembly 110 forms the cylindrical region 12. Radiation produced by the system 10 will flow from the input and output ends of the cylindrical region 12, so a shield to prevent leakage is preferably provided to avoid exposure of personnel to radiation. In accordance with one embodiment, a helix or an auger of sufficient shielding capacity is inserted into each of the input and output openings to the cylindrical region 12, but not within the region 12 itself. Accordingly, as shown in FIG. 4, a first shielding helix or auger 48A is provided at an input end of the tube 15A or window assembly 110, and a second shielding helix or auger 48B is provided at an output end of the tube or window assembly. In one example, the shielding helixes or augers 48A, 48B are constructed from stainless steel coated copper. The shielding helixes or augers 48A, 48B provide shielding to prevent radiation from escaping. Also, the helix or auger shielding increases turbulence in the cylindrical region 12.

The edges of the shielding helixes or augers 48A, 48B are in contact or near contact with the inner walls at the input and output sections of the tube 15A or window assembly 110 through which media flows. The media flows through the helix or auger in a spiral geometry. This method provides two advantages: a compact shield against escaping radiation; and a means to create turbulence of the media flow entering the cylindrical region 12 and bringing the flowing media closer to the maximum region of power deposition of the electron beam, located in a layer closer to the electron beam windows 28. This aids the system design goal of providing uniform dose distribution (or beam power deposition) to all unit volumes of media flowing through the cylindrical region 12, and improves overall system treatment efficiency.

In accordance with one contemplated modification, within the cylindrical region 12, a modified helix or auger of smaller diameter leaving gaps between the walls at the input and output sections of the tube 15A or window assembly 110 and helix or auger blades may additionally be provided to force the media flow close to the regions of maximum electron beam intensity, and provide local turbulence close to the electron beam windows 28. The optimum form of such a partial helix or auger might depart from a pure helix or auger shape.

Figure 7:
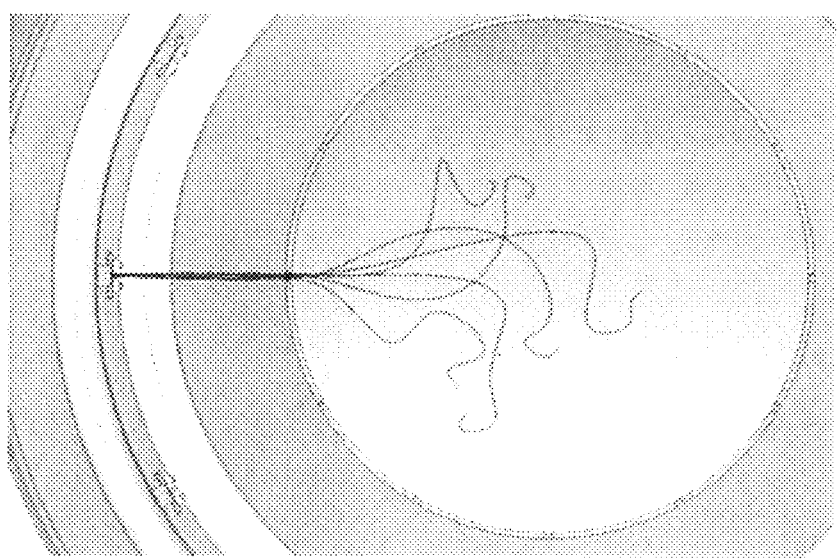
FIG. 7 illustrates an electron beam pattern produced in the system in accordance with the present invention.

As shown in FIG. 7, the inwardly directed electron beam 32 provides a distinct advantage over unidirectional or outwardly directed beams for creating a uniform flux throughout the treatment space defined by the cylindrical region 12. The electrons lose energy from collisions with the molecules entrained in the flowing media, so strength of the interaction of the electron beam and the flowing media decreases with distance from the window surface. Inwardly directed electron beams 32 combine as the energy decreases, and thus maintain greater flux density with distance from the window surface.

The inward direction of the electron beams 32 from the cylindrical structure comprising the cathode 16, control grid 26, and focus grid 44 mounted within the shielding enclosure 46 toward the smaller cylindrical structure comprising the tube 15A or the window assembly 110 improves the transmission of electrons through the windows 28. The electrostatic field intensity increases logarithmically to cause the beams to be focused to a smaller cross-section as they approach the windows 28. Thus, fewer of the electrons strike the supporting structure where they are lost from the beams entering the cylindrical region 12.

Figure 8:
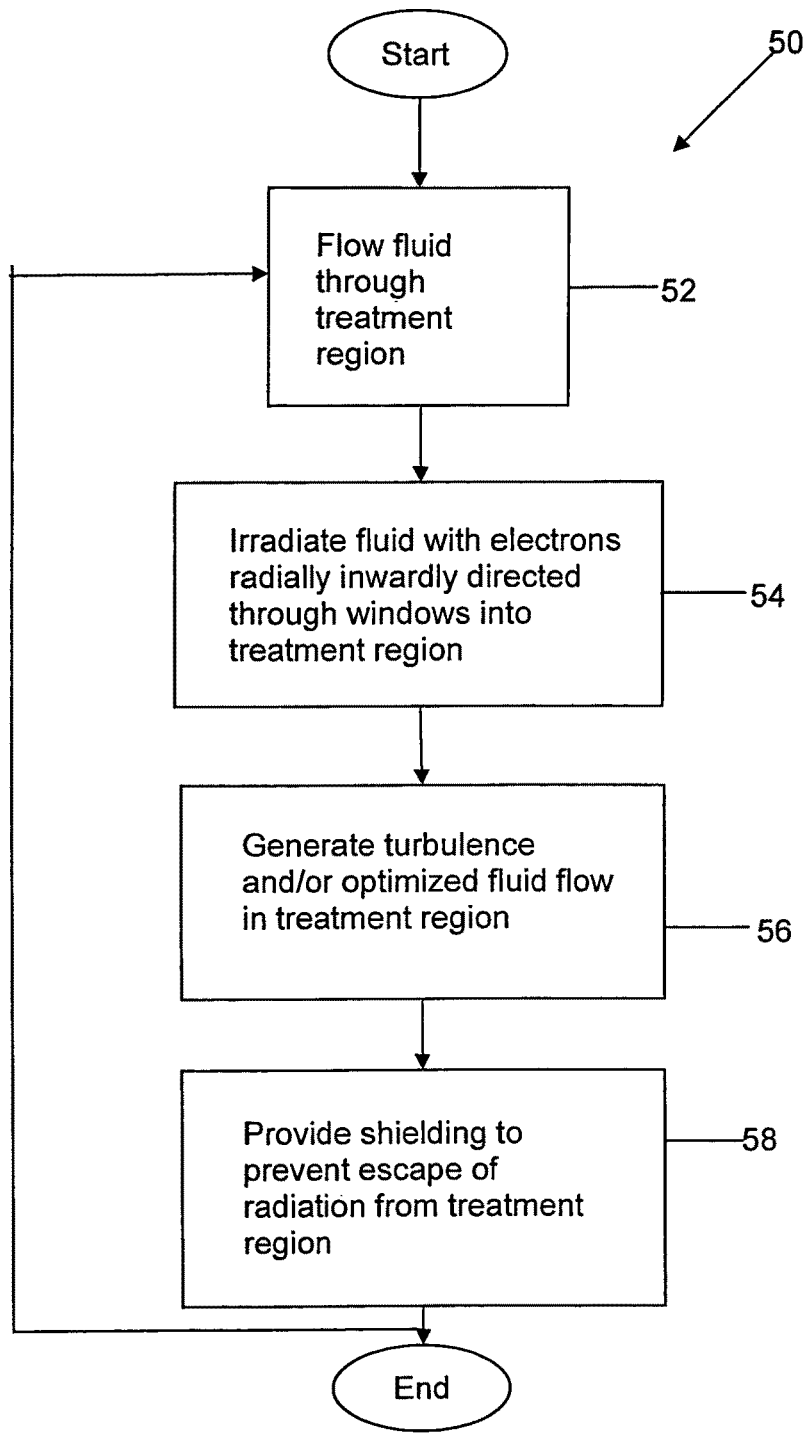
FIG. 8 is a flow diagram illustrating a method in accordance with one embodiment of the present invention.

A preferred embodiment of the method in accordance with an aspect of the present invention is shown in FIG. 8, generally indicated by the numeral 50. Flowing media is introduced into the cylindrical region 12, as indicated by a step 52 shown in FIG. 8. During treatment in the system, the media flowing through the cylindrical region 12 is irradiated with electrons radially inwardly directed through the windows 28 into the treatment region, as indicated by a step 54 shown in FIG. 8. Preferably, turbulence is generated in the media flow in the cylindrical region 12 and/or the media is forced to flow close to the regions of maximum electron beam intensity, as indicated by a step 56 shown in FIG. 8. Also, shielding is preferably provided to prevent escape of radiation from the cylindrical region 12, as indicated by a step 58 shown in FIG. 8.

Subsequently, additional flowing media may be introduced into the cylindrical region 12 and treated, as indicated by the arrow from step 58 to step 52 shown in FIG. 8.

The geometry of inwardly directed electron rays injected into a cylindrical treatment volume provides a very uniform and intense dose across the volume and is uniquely adaptable to media flowing through stacks and pipes to treat waste gases from industrial processes and to sterilize air streams and destroy pathogens or used to destroy contaminants extracted from groundwater or soil.

For example, the variety of applications of radiation to control contaminants in air streams covers a large range of airflow rates. A cylindrical geometry in accordance with the various embodiments of the present invention is scalable to meet this variation in flow rates by defining the inner diameter of the cylindrical region 12 to provide the specified air flow requirement of low pressure drop (typically a few inches of water) through the system. The range of the electrons in air is determined by the energy imparted to the electrons by the high voltage applied to accelerate the electrons, so a high voltage power supply is appropriately specified.

In comparison to other electron beam devices designed for destruction of compounds in flowing media, the various embodiments in accordance with the present invention have the following features:
1. Use of cold cathode technology makes practical the cylindrical design of the system;
2. A cold cathode electron emitter unit that focuses all emitted electrons to the beam exit window for the treatment volume is optimally efficient;
3. A cold cathode electron emitter with control grid for electron emission intensity can adjust electron beam intensity to beam strength required for a given application;
4. A cylindrical design makes simpler and less costly the scaling of system size for a wider range of applications;
5. Allows reduced physical size and construction costs;
6. Reduces weight due to smaller volume of shielding required;
7. Results in reduced operating costs compared to known devices having thermionic cathodes;
8. Use of helix or auger principle to shield input and output of tubular section also provides optimum flow patterns into and, in addition, within the electron beam treatment region of the system.

Figure 20:
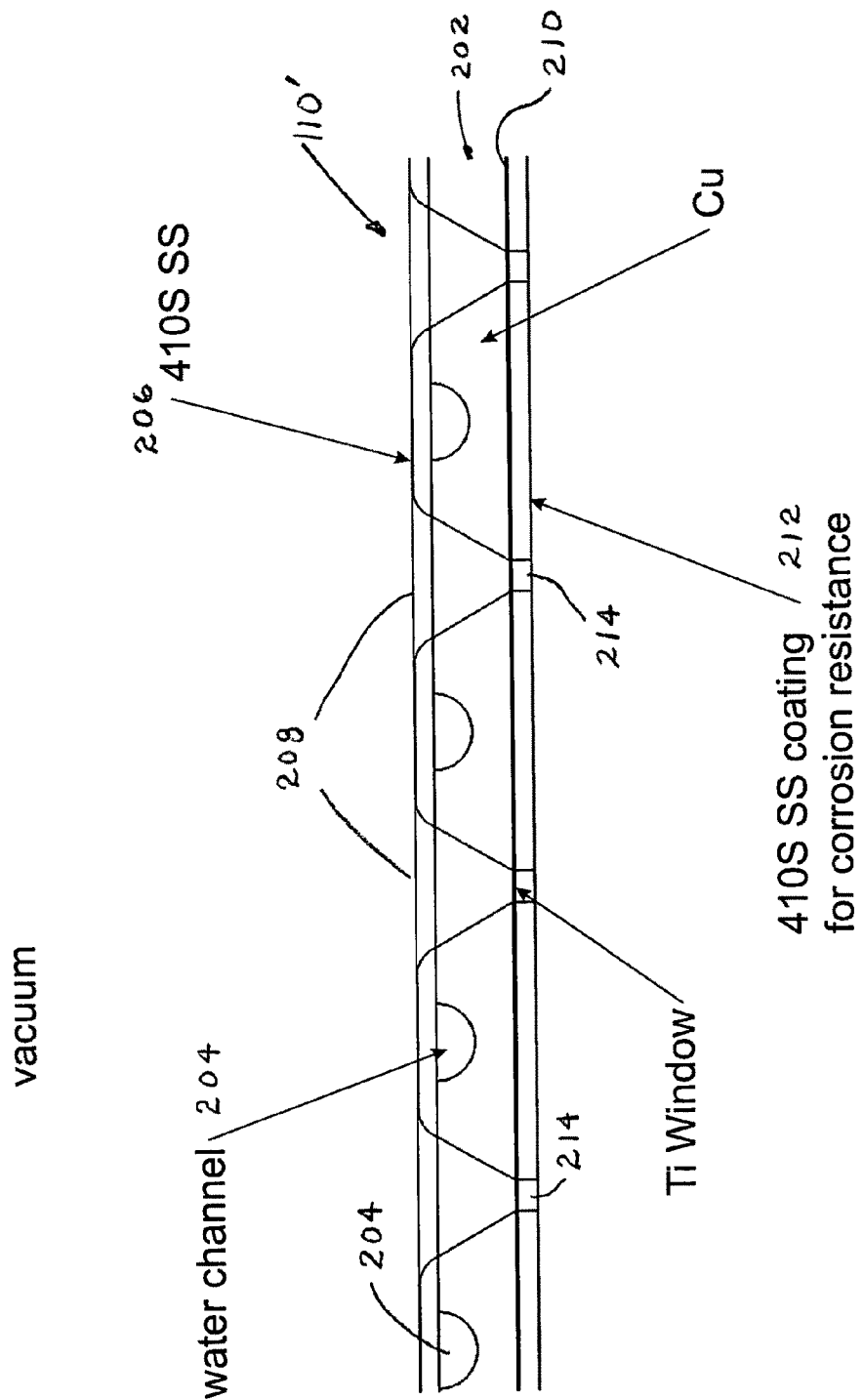
FIG. 20 is a cross-sectional view of an alternative embodiment of the window assembly in accordance with one aspect of the present invention.

An alternative embodiment of the window assembly 110' in accordance with the present invention is shown in FIG. 20. The window assembly 110' comprises a core 202 preferably constructed from a metal having a relatively high coefficient of thermal expansion, for example, OFE grade copper having a coefficient of thermal expansion of $17.6 \times 10^{-6}$ cm/cm ° C. ($9.8 \times 10^{-6}$ in/in ° F.). The core 202 is preferably machined to provide channels 204 that provide conduits for a cooling fluid, for example, water.

The window assembly 110' also comprises an inner support 206 preferably constructed from 410S stainless steel in the example in which the core 202 is constructed from OFE grade copper. A braze sheet (not shown), for example, a copper-gold-nickel material, can be placed between the core 202 and the inner support 206, and the subassembly 202, 206 and braze sheet can then be heated at 780 degrees Centigrade to braze the core to the inner support. The brazed subassembly is then preferably machined to remove any deformation resulting from brazing. The brazed subassembly comprising the core 202 and inner support 206 is also machined to provide a plurality of slits 208 which comprise windows for radiation.

As shown in FIG. 20, the window assembly 110' also comprises an outer corrosion resistant shield 212 preferably constructed from 410S stainless steel in the example in which the core 202 is constructed from OFE grade copper. The outer shield 212 is machined to provide slits 214 which comprise windows for radiation.

Foil 210, for example, titanium alloy foil, is placed against the surface of the core 202 opposite the surface of the core that is brazed to the inner support 206, as shown in FIG. 20. The titanium alloy foil 210 has a thickness of 1.0 mil. or less, for example.

The manufacture of the window assembly 110' can be completed as follows. A material, for example, silver, is deposited onto the titanium-film-covered core 202. The outer shield 212 is then placed against the foil 210, and the assembly is clamped together and heated at approximately 450 degrees centigrade to form a diffusion bond between the titanium-film-covered core 202 and the outer shield.

Radiation supplied by a source (not shown) passes though slits 208, the foil 210, and slits 214 comprising windows of the window assembly 110'. Nipples (not shown) can be connected between the channels 204 and a source of cooling fluid (not shown) to supply cooling fluid to the core 202 to dissipate heat.

While the foregoing description has been with reference to particular embodiments and contemplated alternative embodiments in accordance with the aspects of the present invention, it will be appreciated by those skilled in the art that changes in these embodiments may be made without departing from the principles and spirit of the invention. Accordingly, the scope of the present invention can only be ascertained with reference to the appended claims.

What is claimed is:

1. An irradiation system for treating a flowing contaminated media using a geometry of radially inwardly directed energetic electrons, comprising an electron beam generator including a thermionic cathode comprising a cold cathode emitter having a cold electron emitting surface mounted inside an electrically grounded first cylinder having a first diameter and electrically insulated from said first cylinder, an electrically grounded second cylinder having a second diameter smaller than said first diameter inside and coaxial with said first cylinder, said second cylinder including windows comprising a material to pass said electrons with minimal absorption and reflection, and a voltage source to apply a negative voltage between said cathode and said second cylinder to generate said electrons, and focusing elements comprising a focus grid positioned with respect to said cold cathode emitter to prevent scatter of said electrons and radially inwardly direct said electrons emitted from said cold cathode emitter through said windows into the interior of said second cylinder to irradiate said flowing media.

2. The system of claim 1 wherein the windows are constructed of thin material through which radially inwardly directed electrons pass into the flowing media.

3. The system of claim 2 wherein the focusing elements focus emitted electrons to the windows for optimum system operating efficiency.

4. The system of claim 1, further comprising a tube inside said second cylinder defining a cylindrical region through which the contaminated media flows in an axial direction, and into which the radially injected electrons enter and interact with contaminants in the media.

5. The system of claim 4, further comprising a radiation shield in the form of a helix or auger having a diameter approximately the same as the tube diameter, inserted into the input and output sections of the tube for the purpose to prevent radiation produced by the electron beam from leaking into occupied areas and simultaneously causing directed turbulence through the cylindrical region to increase treatment uniformity and efficiency.

6. The system of claim 4, further comprising a helix or auger in the cylindrical region having a diameter smaller than the tube diameter, with gap to wall appropriate to further enhance uniformity of treatment and efficiency.

7. The system of claim 1, further comprising a beam intensity control grid positioned with respect to said cold cathode emitter to control generation of said electrons.

8. The system of claim 7 wherein the cold cathode emitter is equipped with a control grid that can adjust electron beam intensity to adapt beam intensity to that required for a particular treatment application.

9. The system of claim 1 wherein the second cylinder comprises a window component subassembly, comprising:
an outer cylinder having a plurality of slits comprising windows for radiation; and
an inner cylinder comprising foil, the inner cylinder being disposed within the outer cylinder and bonded to the outer cylinder to enable the transfer of heat away from the regions of the foil at the locations of the windows.

10. The system of claim 9 wherein the inner cylinder comprises an additional cylinder comprising an inner sleeve having a given outside diameter, the inner sleeve having a plurality of slits which comprise windows for radiation;
wherein the foil is placed around the circumference of the inner sleeve so as to overlie the slits in the inner sleeve; and
wherein the outer cylinder comprises the outer sleeve having a given inside diameter that is greater than the outside diameter of the inner sleeve and a given outside diameter constructed from a metal having a relatively high coefficient of thermal expansion; and
an outer support having a given inside diameter that is larger than the outside diameter of the outer sleeve;
wherein the outer sleeve and outer support are joined together and provided with a plurality of slits which comprise windows for radiation; and
wherein the foil-wrapped inner sleeve is disposed in the outer sleeve so that the slits of the inner sleeve align with the slits of the outer sleeve and outer support.

11. The system of claim 10 wherein the inner sleeve is constructed from a titanium alloy.

12. The system of claim 10 wherein the foil is a titanium alloy foil.

13. The system of claim 10 wherein the outer sleeve is constructed from OFE grade copper.

14. The system of claim 10 wherein the outer sleeve and outer support are brazed together using a braze sheet consisting of a copper-gold-nickel material disposed between the outer sleeve and the outer support.

15. The system of claim 10, further comprising:
a first end support subassembly and a second end support subassembly constructed from a metal having a relatively high coefficient of thermal expansion, the first and second end support subassemblies each comprising a flange having an outside diameter that is less than the inside diameter of the inner sleeve of the window component subassembly, wherein the flanges are disposed in opposite ends of the inner sleeve and heated to form a diffusion bond between the first and second end support subassemblies and window component subassembly.

16. The system of claim 1 wherein the second cylinder comprises a window assembly, comprising:
a core constructed from a metal having a relatively high coefficient of thermal expansion provided with channels that provide conduits for a cooling fluid;
an inner support;
wherein the core and the inner support are joined together and provided with a plurality of slits which comprise windows for radiation;
foil placed against a surface of the core opposite a surface of the core that is joined to the inner support; and
an outer corrosion resistant shield joined to the foil-covered core and provided with slits which comprise windows for radiation.

17. The system of claim 16 wherein the core is constructed from OFE grade copper.

18. The system of claim 16 wherein the inner support is constructed from 410S stainless steel.

19. The system of claim 16 wherein the core and the inner support are brazed together using a braze sheet consisting of a copper-gold-nickel material, disposed between the core and the inner support.

20. The system of claim 16 wherein the foil is titanium alloy film.

21. The system of claim 16 wherein the outer corrosion resistant shield is constructed from 410S stainless steel.

22. The system of claim 16 wherein the outer shield is placed against the foil and heated to form a diffusion bond between the foil-covered core and the outer corrosion resistant shield.

* * * * *